US009313746B2

(12) United States Patent
Li et al.

(10) Patent No.: US 9,313,746 B2
(45) Date of Patent: Apr. 12, 2016

(54) METHOD AND APPARATUS FOR DETERMINING TRANSMISSION POWER OF A SECONDARY TRANSMITTER IN A HIERARCHICAL SPECTRUM SHARING SYSTEM

(75) Inventors: Chaofeng Li, Beijing (CN); Lei Jiang, Beijing (CN); Ming Lei, Beijing (CN)

(73) Assignee: NEC (China) Co., Ltd., Beijing (CN)

( * ) Notice: Subject to any disclaimer, the term of this patent is extended or adjusted under 35 U.S.C. 154(b) by 165 days.

(21) Appl. No.: 13/995,845

(22) PCT Filed: Sep. 16, 2011

(86) PCT No.: PCT/CN2011/079777
§ 371 (c)(1),
(2), (4) Date: Sep. 9, 2013

(87) PCT Pub. No.: WO2013/037137
PCT Pub. Date: Mar. 21, 2013

(65) Prior Publication Data
US 2013/0344913 A1 Dec. 26, 2013

(51) Int. Cl.
*H04B 7/00* (2006.01)
*H04W 52/24* (2009.01)
(Continued)

(52) U.S. Cl.
CPC .......... *H04W 52/241* (2013.01); *H04W 52/244* (2013.01); *H04W 52/226* (2013.01); *H04W 52/34* (2013.01)

(58) Field of Classification Search
USPC ........... 455/426.1, 435.2, 436–444, 449, 450, 455/522, 67.11, 68–70, 115.3, 126, 127.1, 455/127.2, 135, 226.3, 277.2, 296; 370/318, 328
See application file for complete search history.

(56) References Cited

U.S. PATENT DOCUMENTS 8,818,443 B2 * 8/2014 Yamamoto et al. ........... 455/522
8,862,134 B1 * 10/2014 Zhou ............................ 455/443
(Continued)

FOREIGN PATENT DOCUMENTS

CN  101610571 A  12/2009
CN  101779503 A   7/2010
(Continued)

OTHER PUBLICATIONS

Communication dated May 27, 2014 from the Japanese Patent Office, in counterpart Japanese Patent Application No. 2013-558289.
(Continued)

*Primary Examiner* — Dominic E Rego
(74) *Attorney, Agent, or Firm* — Sughrue Mion, PLLC (57) ABSTRACT

The present invention provides a method and apparatus for determining a transmission power of a secondary transmitter in a hierarchical spectrum sharing system. The method can comprise steps of obtaining channel quality information on a primary link from at least one primary receiver within a transmission range of the secondary transmitter; and determining the transmission power for the secondary transmitter based on the channel quality information, wherein the transmission power is matched with the channel quality indicated by the channel quality information. According to the embodiments of the present invention, a power control scheme is applied to the secondary transmitter based on the channel quality information on the primary link. In such a way, the secondary transmitter' throughput can be improved with controllable rate loss to the primary receiver and accordingly the spectrum efficiency for the whole system can be further upgraded.

16 Claims, 6 Drawing Sheets (51) Int. Cl.
*H04W 52/22* (2009.01)
*H04W 52/34* (2009.01)

(56) References Cited

U.S. PATENT DOCUMENTS

| | | | | |
|---|---|---|---|---|
| 2004/0013102 | A1* | 1/2004 | Fong et al. | 370/345 |
| 2007/0133458 | A1* | 6/2007 | Chandra et al. | 370/329 |
| 2009/0042596 | A1* | 2/2009 | Yavuz et al. | 455/522 |
| 2009/0122739 | A1* | 5/2009 | Yonezawa | 370/312 |
| 2009/0274220 | A1* | 11/2009 | Yun et al. | 375/244 |
| 2009/0286496 | A1* | 11/2009 | Yavuz et al. | 455/127.1 |
| 2010/0144338 | A1* | 6/2010 | Kim et al. | 455/422.1 |
| 2010/0260052 | A1* | 10/2010 | Cho et al. | 370/241 |
| 2010/0279686 | A1* | 11/2010 | Tokgoz et al. | 455/435.1 |
| 2011/0177808 | A1* | 7/2011 | Grokop et al. | 455/423 |
| 2011/0217974 | A1* | 9/2011 | Naka et al. | 455/423 |
| 2011/0250919 | A1* | 10/2011 | Barbieri et al. | 455/509 |
| 2011/0275361 | A1* | 11/2011 | Yavuz et al. | 455/422.1 |
| 2012/0252453 | A1* | 10/2012 | Nagaraja et al. | 455/436 |
| 2013/0102309 | A1* | 4/2013 | Chande et al. | 455/435.1 |
| 2013/0157650 | A1* | 6/2013 | Yavuz et al. | 455/422.1 |

FOREIGN PATENT DOCUMENTS

| | | |
|---|---|---|
| CN | 101895924 A | 11/2010 |
| CN | 102026356 A | 4/2011 |

OTHER PUBLICATIONS

Lapiccirella, F.E., et al, Multi-channel Opportunistic Access Based on Primary ARQ Messages Overhearing, Proc. of IEEE Int. Conf. on Communications, Jun. 5, 2011.

Bagayoko, A., et al, Power Control of Spectrum-Sharing in Fading Environment With Partial Channel State Information, IEEE Trans. on Signal Processing, May 2011, vol. 59, No. 5, p. 2244-2256.

YuanYuan He, et al, Power Allocation in Spectrum Sharing Cognitive Radio Networks with Quantized Channel Information, IEEE Trans. on Communications, Jun. 2111, vol. 59, No. 6, p. 1644-1656.

Communication dated Aug. 7, 2015 from the State Intellectual Property Office of the P.R.C. in counterpart application No. 201180063861.9.

Shin-Ming Cheng, et al., On Exploiting Cognitive Radio to Mitigate Interference in MACRO/FEMTO Heterogeneous Networks, IEEE Wireless Communications, pp. 40-47, Date Jun. 2011.

Gürkan Gür et al, Cognitive Femtocell Networks: An Overlay Architecture for Localized Dynamic Spectrum Access, IEEE Wireless Communications, pp. 62-70, Dated Aug. 2010.

Kentaro Nishimori et al, Distributed Interference Cancellation for Cognitive Radios Using Periodic Signals of the Primary System, IEEE Transactions on Wireless Communications, Accepted for Publication, pp. 1-11, Dated 2011.

Rui Zhang, Optimal Power Control over Fading Cognitive Radio Channels by Exploiting Primary User CSI, arXiv:0804.1617v2 [cs.IT], pp. 1-15, Dated Feb. 17, 2009.

* cited by examiner

METHOD AND APPARATUS FOR DETERMINING TRANSMISSION POWER OF A SECONDARY TRANSMITTER IN A HIERARCHICAL SPECTRUM SHARING SYSTEM

CROSS REFERENCE TO RELATED APPLICATIONS

This application is a National Stage of International Application No. PCT/CN2011/079777, filed on Sep. 16, 2011, the contents of all which are incorporated herein by reference in their entirety.

FIELD OF THE INVENTION

Embodiments of the present invention generally relate to the field of a mobile communication technology, and more particularly, relate to a method and apparatus for determining transmission power of a secondary transmitter in a hierarchical spectrum sharing system.

BACKGROUND OF THE INVENTION

The hierarchical spectrum sharing is a technique which categorizes wireless users in the hierarchical spectrum sharing system into primary users and secondary users in terms of spectrum-using privilege. In such a hierarchical spectrum sharing system, a primary user and a secondary user can share the same frequency band but the primary user has a privilege of using the frequency band and is oblivious to the co-exiting secondary user, and thus the primary user can use the frequency band at any moment. To the contrary, the secondary user can only use the frequency band when there is a suitable opportunity, such as in a condition that the primary user is transmitting signals at a low signal quality, a low signal quality is acceptable to the primary user, and etc. The hierarchical spectrum sharing technique can be applied to a variety of scenarios, for example the well-known cognitive radio, the heterogeneous network (such as, a macro/femto network, a macro/pico network, a macro/micro network and so on), and etc. Moreover, it has many advantages such as flexibility and ability of improving spectrum efficiency and thus it is critical for the next generation networks.

However, for the hierarchical spectrum sharing system, the main problem lies in the cross-tier interference, especially the secondary user's interference with the primary users in its vicinity because the primary users are oblivious to the co-exiting secondary users and thus have no knowledge about interference from the secondary user, which brings a great difficulty to cope with such interference. Therefore, it usually requires the interference from the secondary user to be limited to a certain level so as to have a tolerable effect on the primary users.

The macro/femto heterogeneous network is one of typical hierarchical spectrum sharing systems and has received a considerable attention recently. The FAP (Femtocell Access Point) is possible to offload the burden from the macrocell and improve the coverage of the cellular network. Moreover, the femtocell can help to plug the indoor coverage holes, especially when the signal from the macro cell can not penetrate homes due to difficult radio propagation conditions.

As is known, the FAP has a limited transmission range, usually in a home or office area, but it can offer immense capacity improvement for the network due to the ability to reuse the frequency band more often. However, unauthorized macro user equipments (MUEs) can only connect to its macro eNodeB (MeNB) and are not allowed to connect to the FAP even if they are located in the Femtocell Transmission Range (FTR). Therefore, the MUEs may suffer heavy cross-tier interference which is a problem to be tackled urgently.

The article "On exploiting cognitive radio to mitigate interference in macro/femto heterogeneous networks" by S.-M Cheng, et al. (*IEEE Wireless Commun.*, vol. 18, no. 3, pp. 40-47, June, 2011) has proposed a possible solution to tackle the problem about the cross-tier interference. In this article, the MUE will adopt a HARQ (Hybrid Automatic Repeat Request) scheme wherein one packet can be repeatedly transmitted within the next several timeslots when the previous transmission attempt fails. For the purpose of illustration, reference will be made to FIG. 1 and FIG. 2 to describe the solution disclosed in that article.

Figure 1:
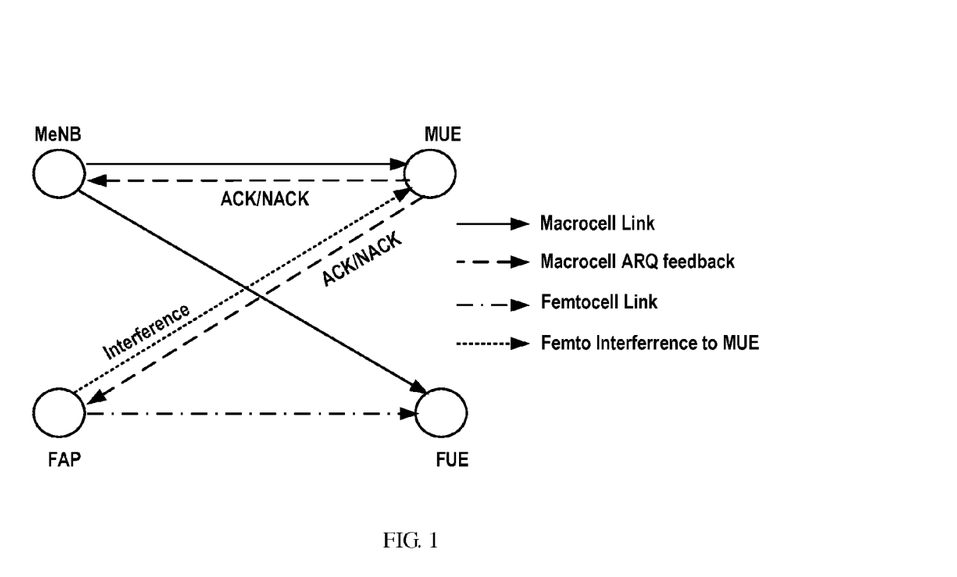
FIG. 1 schematically illustrates a diagram of a simplified architecture for a solution for femtocell interference mitigation in a macro/femto heterogeneous network in the prior art.
Figure 2:
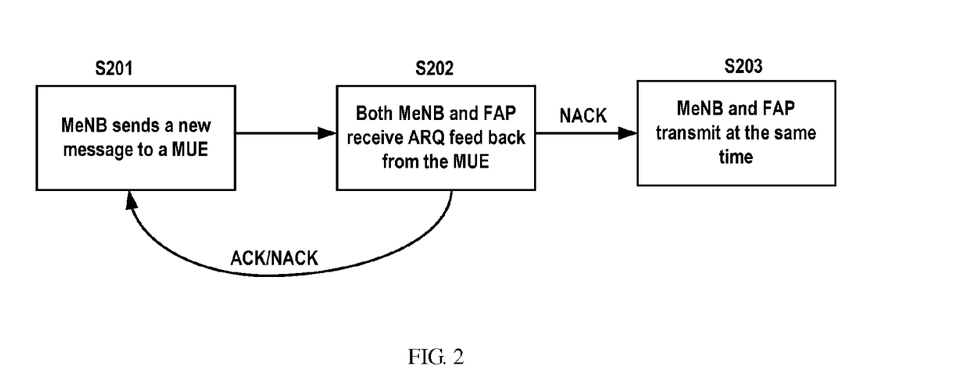
FIG. 2 schematically illustrates a flow chart of a solution for femtocell interference mitigation in a macro/femto heterogeneous network in the prior art.

Referring to FIG. 1, it schematically illustrates a diagram of a simplified architecture for a solution for femtocell interference mitigation in a macro/femto heterogeneous network as disclosed in the above-mentioned article. As illustrated in the figure, the system comprises a MeNB, a MUE, a FAP and a FUE (Femto User Equipment). The message sent to the MUE will be received by both the MUE and the FUE, and, similarly, the information fed back from the MUE to the MeNB will be received by both the MeNB and the FAP; and the message directed to FUE will also be received by the MUE and interfere with MUE. According to the flow chart as shown in FIG. 2, the FAP will keep silence during the MeNB's first transmission attempt (Step S201) and obverse the ARQ feedback from the MUE (Step S202), that is to say, the ARQ feedback from MUE will be received by both the MeNB and the FAP (as shown by the long dash arrow in FIG. 1) instead of only by the MeNB. On one hand, if the ARQ feedback is an ACK, which means the packet being successfully received at the MUE, the FAP will do nothing but keep observing the subsequent ARQ feedbacks from the MUE; on the other hand, if the ARQ feedback is a NACK, which means that the MUE fails to decode the packet successfully and a retransmission is required, the FAP will send its own packet to the FUE during the MeNB's retransmission (Step S203). The reason that the FAP could transmit its packet during the retransmission period lies in that the SINR requirement at MUE for decoding the packet from MeNB during this period is not as high as the first transmission attempt due to HARQ scheme and thus the MUE can tolerate a moderate interference from FAP.

In the aforesaid solution, the cross-tier interference has mitigated and the spectrum efficiency has been improved. However, with the explosive increase in demand for higher data rates and lower power consumptions, there is still a need in the art to further improve the spectrum efficiency.

SUMMARY OF THE INVENTION

In view of the foregoing, the present invention provides solutions for determining a transmission power of a secondary transmitter in a hierarchical spectrum sharing system, which can provide improved spectrum efficiency.

According to an aspect of present invention, there is provided a method for determining a transmission power of a secondary transmitter in a hierarchical spectrum sharing system. The method can comprise: obtaining channel quality information on a primary link from at least one primary receiver within a transmission range of the secondary transmitter; and determining the transmission power for the secondary transmitter based on the channel quality information, wherein the transmission power is matched with the channel quality indicated by the channel quality information.

In an embodiment of the present invention, the determining the transmission power for the secondary transmitter based on the channel quality information can comprise: determining the transmission power based on the channel quality information so that the secondary transmitter's throughput is optimized with a tolerable rate loss to the primary receiver.

In another embodiment of the present invention, the determining the transmission power based on the channel quality information can comprise: selecting the transmission power corresponding to a channel quality indicator index indicated by the channel quality information from a predetermined power control codebook in which each transmission power corresponding to each channel quality indicator index could ensure that the secondary transmitter's throughput is maximized with a tolerable rate loss to the primary receiver.

In a further embodiment of the present invention, wherein the predetermined power control codebook is determined offline by acquiring channel distribution information for the primary link and cross-tier links; solving an optimization problem which maximizes the secondary transmitter's throughput under the tolerable rate loss to the primary receiver and power constraint at the secondary transmitter based on the channel distribution information, so as to obtain each transmission power corresponding to each channel quality indicator index; and recording a codebook indicating the correspondence between each transmission power and each channel quality indicator index as the predetermined power control codebook.

In a yet further embodiment of the present invention, the predetermined power control codebook is determined for any one of scheduling information on primary users being available at the secondary transmitter and the primary receiver being protected only when the primary receiver is scheduled; scheduling information on primary users being unavailable at the secondary transmitter and the primary receiver being protected based on a probability of the primary receiver to be scheduled; and scheduling information on primary users being unavailable at the secondary transmitter and the primary receiver being protected at all times.

In a still further embodiment of the present invention, the highest one of channel qualities as indicated by the channel quality information is considered as a basic reference channel quality for determining the transmission power for the secondary transmitter.

In a still yet further embodiment of the present invention, the channel quality of a scheduled primary receiver located in the transmission range of the secondary transmitter or the possible lowest channel quality is considered as a basic reference channel quality for determining the transmission power for the secondary transmitter.

In another embodiment of the present invention, the method can further comprise determining transmission rate for the secondary from the determined transmission power.

In a further embodiment of the present invention, wherein the obtaining the channel quality information on the primary link from the at least one primary receiver can comprise: listening to a Control/Feedback Channel for the primary link.

In a still further embodiment of the present invention, the hierarchical spectrum sharing system can comprise a macro/femto heterogeneous network, and wherein the primary receiver can be a macrocell user equipment and the secondary transmitter can be a femtocell access point.

In another aspect of the present invention, there is also provided an apparatus for determining a transmission power of a secondary transmitter in a hierarchical spectrum sharing system. The apparatus can comprise information obtaining unit for obtaining channel quality information on a primary link from at least one primary receiver within a transmission range of the secondary transmitter; and power determination unit for determining the transmission power for the secondary transmitter based on the channel quality information, wherein the transmission power is matched with the channel quality indicated by the channel quality information.

According to the embodiments of the present invention, a power control scheme is applied to the secondary transmitter based on the channel quality information on the primary link. In such a way, the secondary transmitter' throughput can be improved with controllable rate loss to the primary receiver and accordingly the spectrum efficiency for the whole system can be further upgraded. Particularly, in some preferred embodiments of the present invention, the secondary transmitter' throughput can be maximized with controllable rate loss to the primary receiver.

BRIEF DESCRIPTION OF THE DRAWINGS

The above and other features of the present invention will become more apparent through detailed explanation on the embodiments as illustrated in the embodiments with reference to the accompanying drawings throughout which like reference numbers represent same or similar components and wherein.

DETAILED DESCRIPTION OF EMBODIMENTS

Hereinafter, a method and apparatus for determining a transmission power of a secondary transmitter in a hierarchal spectrum sharing system as provided in the present invention will be described in detail through embodiments with reference to the accompanying drawings. It should be understood that these embodiments are presented only to enable those skilled in the art to better understand and implement the present invention, not intend for limiting the scope of the present invention in any manner.

It should be first noted that this invention is illustrated in particular sequences for performing the steps of the methods. However, these methods are not necessarily performed strictly according to the illustrated sequences, and they can be performed in reverse sequence or simultaneously based on natures of respective method steps. Beside, the indefinite article "a/an" as used herein does not exclude a plurality of such steps, units, devices, and objects, and etc.

Hereinafter, embodiments of the present invention will be described in details with reference to the figures.

Firstly, reference will be made to FIG. 3 to describe a method for determining a transmission power of a secondary transmitter in a hierarchical spectrum sharing system as provided in the present invention.

Figure 3:
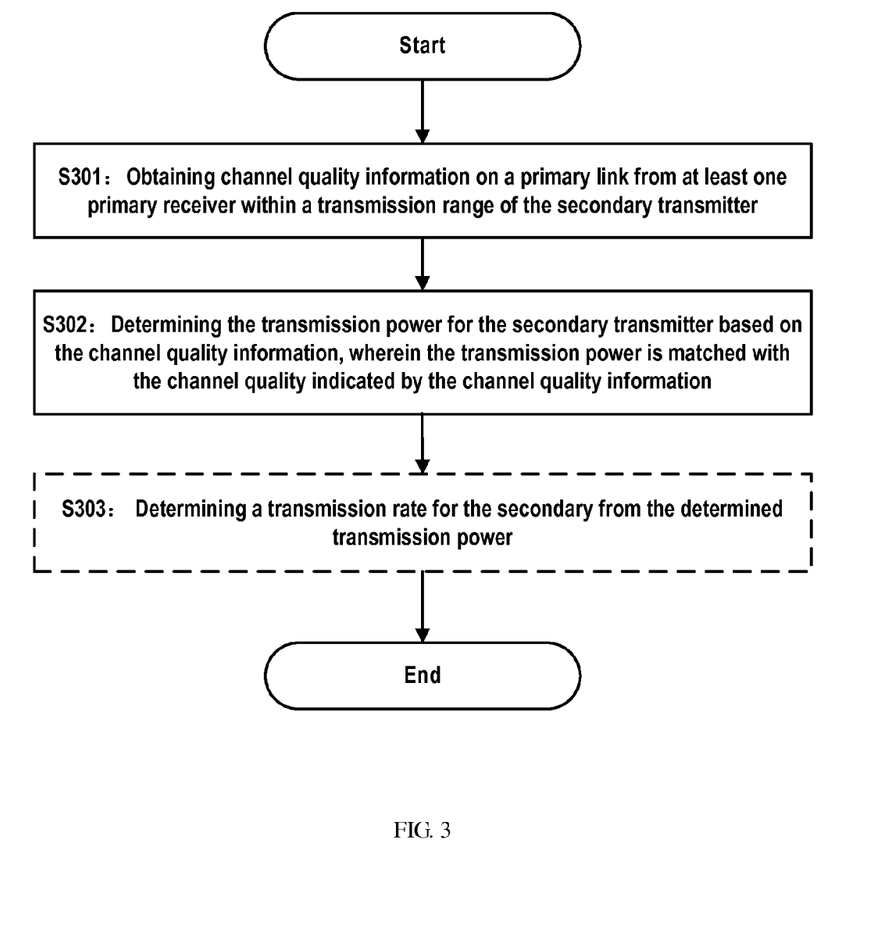
FIG. 3 schematically illustrates a flow chart of a method for determining a transmission power of a secondary transmitter in a hierarchal spectrum sharing system according to an embodiment of the present invention.

As shown in FIG. 3, at step S301, channel quality information on a primary link is obtained from at least one primary receiver within a transmission range of the secondary transmitter.

Generally, the primary transmitter will serve the primary receivers according to the channel quality information fed back from the primary receivers. To this end, the primary receiver will measure the channel state through the channel testing and generate channel quality information (such SINR index) on the primary link based thereon. Then the primary receiver will send such information to the primary transmitter via a control/feedback channel. For example, in LTE system, the channel quality information on the downlink will be fed back from MUE to the MeNB via the Public Uplink Control Channel (PUCCH). Therefore, in embodiments of the present invention, the channel quality information on the primary link can be obtained by listening to the Control/Feedback Channel of the primary link. The channel quality information can be for example Channel Quality Indicator (CQI) feedbacks (such as CQI index) from the MUE sides and can also be in other form of indicating the channel quality.

Then, at step S402, a transmission power for the secondary transmitter is determined based on the channel quality information, wherein the transmission power is matched with the channel quality indicated by the channel quality information.

After obtaining the information on the channel quality, the transmission power can be selected judiciously at the secondary transmitter to match with the channel quality as indicated by the channel quality information, that is to say, the transmission power should be selected so that the spectrum efficiency can be improved at the secondary transmitter and at the same time the rate loss to the primary receiver (i.e. the interference with the primary receiver) is under a certain/tolerable level.

In an embodiment of the present invention, the transmission power is determined based on the channel quality information so that the secondary transmitter's throughput is optimized with a tolerable rate loss to the primary receiver. In such a way, the secondary transmitter can share the subband with an improved throughput while its interference to the primary receiver is still under the tolerable level.

In a further embodiment of the present invention, the transmission power corresponding to a CQI index indicated by the channel quality information can be selected from a predetermined power control codebook. Such a codebook indicates the correspondence between CQI indices and transmission powers, and each transmission power corresponding to each channel quality indicator index could ensure that the secondary transmitter's throughput is maximized with a tolerable rate loss to the primary receiver. The power control codebook can be a codebook predetermined by experiences, experiments, system simulations and so on. However, in a preferred embodiment of the present invention, it is determined offline by solving an optimization problem which maximizes the throughput of the secondary transmitter under the tolerable rate loss to the primary receiver and a power constraint at the secondary transmitter.

Next, reference will be made to FIG. 4, which shows a flow chart of a method for determining the predetermined power control codebook according to an embodiment of the present invention, to describe an example method for determining the power control codebook.

Figure 4:
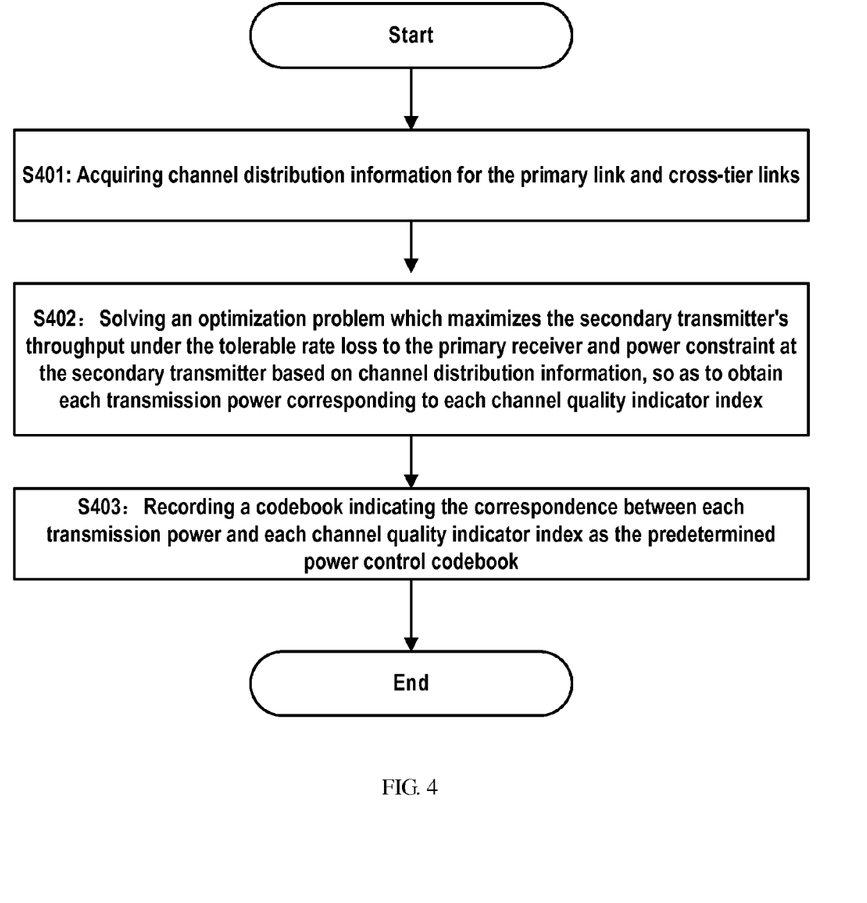
FIG. 4 schematically illustrates a flow chart of a method for determining a predetermined power control codebook according to an embodiment of the present invention.

As shown in FIG. 4, at step S401, the channel distribution information for the primary link and the cross-tier links are acquired. For example, if the wireless channels undergo the Rayleigh fading, the means of the distribution is required. For the downlink transmission, the primary link means the downlink from the primary transmitter to the primary receiver. The cross-tier links refer to the interfering links which include the cross-tier link from the primary transmitter to the secondary receiver and the cross-tier link from the secondary transmitter to the primary receiver. For the difficulty to acquire the channel distribution information in real time, the statistical information on the channel distribution can be obtained as an alternative. The statistical information can be gathered by the primary user and then sent to for example the secondary users. This task can be finished by backhaul communication and pilot symbols.

Then, as step S402, an optimization problem is solved which maximizes the secondary transmitter's throughput under the tolerable rate loss to the primary receiver and the power constraint at the secondary transmitter based on the channel distribution information, so as to obtain each transmission power corresponding to each channel quality index.

Based on the channel distribution information, it can obtain the mathematics expressions of the secondary transmitter's throughput, the rate loss to the primary receiver, and the power at the secondary transmitter. With these mathematics expressions, it can easily construct the objective function, the rate loss constraint and the power limitation constraint so as to establish an optimization model/problem which maximizes the secondary transmitter's throughput under the tolerable rate loss to the primary receiver and the power constraint at the secondary transmitter.

By solving the optimization problem, it can obtain each transmission power corresponding to each channel quality index.

Next, at step S403, a codebook indicating the correspondence between each transmission power and each channel quality indicator index is recorded as the predetermined power control codebook.

Based on the determined transmission powers corresponding to respective channel quality indices, a codebook indicating the correspondence therebetween can be formed, which is the aforesaid predetermined power control codebook. In the codebook each transmission power corresponding to each channel quality indicator index could ensure that the secondary transmitter's throughput is maximized with a tolerable rate loss to the primary receiver.

Additionally, scheduling information on primary users may be or not be available at the secondary transmitter, therefore different schemes can be employed for different conditions and these mathematics expressions will also vary with different schemes. For example, for a scenario that the scheduling information is available at the secondary transmitter, a primary receiver within the transmission range of the secondary transmitter can be protected only when it is scheduled; as to a scenario that the scheduling information is not available at secondary transmitter, the primary receiver can be protected based on the probability of the primary receiver to be scheduled, or alternatively the primary receiver can be protected at all time as long as it is located in the transmission range of the secondary transmitter.

Accordingly, for different schemes, it can obtain different sets of the mathematics expressions, that is to say, for different schemes it can build different optimization models and thus obtain different power control codebooks. For details about the optimization problem, please see specific examples of constructing the optimization problem which will be described hereinafter.

Additionally, when the secondary transmitter has obtained more than one channel qualities, a basic reference channel quality for determining the transmission power for the secondary transmitter will vary with different schemes. For example, for the scenario that the scheduling information is available at the secondary transmitter, if it is known that the primary receiver located in the transmission range of the secondary transmitter is scheduled, the channel quality of the scheduled primary receiver can be taken as the basic reference channel quality, or otherwise, the possible lowest channel quality for example is considered as the basic reference channel quality (i.e., CQI is considered as zero). Regarding the scenario that the scheduling information is not available at secondary transmitter, the highest one of channel qualities as indicated by the channel quality information is considered as the basic reference channel quality when a max-C/I scheduler is used at the primary transmitter.

Referring back to FIG. 3, preferably, at step S303, it can further determine the transmission rate for the secondary transmission from the determined transmission power.

It is known that, for an optimized transmission power, there is always a corresponding suitable power rate, which has a predetermined relationship with the transmission power. If we can further determine the suitable transmission rate for the secondary transmitter, it will be advantageous because it will further ensure that the secondary's transmitter's throughput is maximized. The skilled in the art will appreciate that the transmission rate can also be selected in other manner but it will loss the corresponding benefit.

From the description of the present invention in the foregoing, it can be seen that in the embodiments of the present invention, a power control scheme is applied to the secondary transmitter based on the channel quality information on the primary link. In such a way, the secondary transmitter' throughput can be improved with controllable rate loss to the primary receiver and accordingly the spectrum efficiency for the whole system can be further upgraded. Particularly, in some preferred embodiments of the present invention, the secondary transmitter' throughput can be maximized with controllable rate loss to the primary receiver.

Hereinbelow, for a purpose of illustration, a typical downlink femtocell co-existing with a multiple-user macrocell system, i.e., a macro/femto heterogeneous system, will be taken as a specific application scenario to further describe the present invention. However, it should be noted that the present application is not limited thereto but can be applied to any other hierarchical spectrum sharing system, such as other heterogeneous system, cognitive system and so on, and it can also be applied to the uplink transmission.

Figure 5:
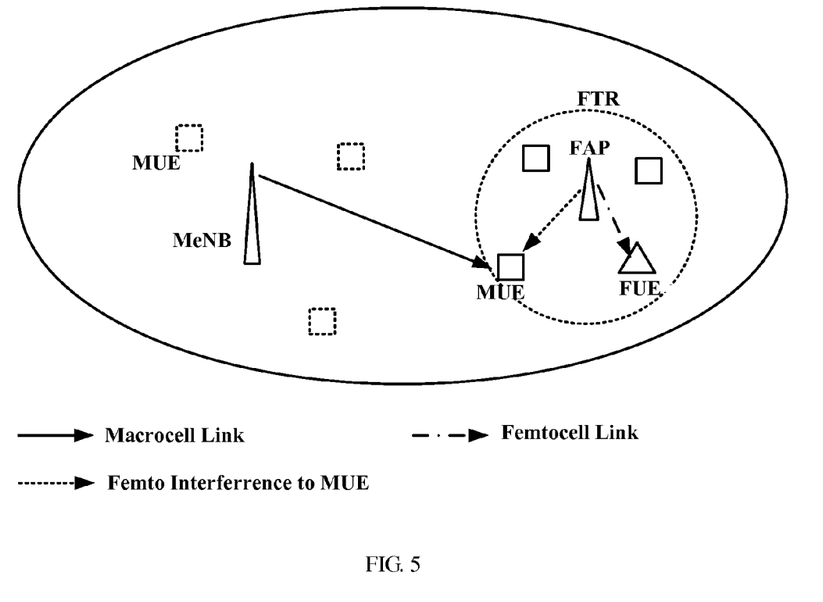
FIG. 5 schematically illustrates a diagram of a typical femtocell co-existing with a multiple-user macrocell system and its interference with a MUE.

Before the present invention is further described, reference will be first made to FIG. 5 to describe a system model of the typical downlink femtocell co-existing with a multiple-user macrocell system.

In the system of FIG. 5, the same subband is shared between the femtocell and the macrocell, i.e. universal frequency reuse and for a purpose of simplification, a single subband scenario is considered. As illustrated in FIG. 5, in the macro cell, there are one MeNB and M MUEs, wherein N MUEs are located in FTR (N≤M). The MeNB is responsible for serving all connected MUE within the macrocell according to CQI feedbacks from the MUE side. Moreover, it is assumed that MeNB adopts the max-C/I scheduler where the MUE with highest CQI index is selected as the active user. Additionally, the MeNB adopts a constant transmission power $P_M$ for this subband except for CQI=0 where MeNB will refrain itself from transmitting, and uses the Adaptive Modulation and Coding (AMC) scheme to match the channel with proper transmission rate. The channel propagation gain between MeNB and MUE is represented by $g_m$ where m=1; 2; ...; M.

In the femtocell, there is a FAP and a FUE and the FAP will serve the FAP in its FTR. Thus, when the FAP transmits a message to the FUE, it will interfere with a scheduled MUE located in the FTR. Therefore, the fundamental issue for this system is to cope with the interference from FAP to MUE as indicated by short dash arrow in FIG. 5. In addition, those MUEs, as illustrated by dashed square, which are believed to be out of the FTR and will not be interfered with by the FAP's transmission. Besides, the channel gains between FAP and MUE, FAP and FUE, MeNB and FUE can be denoted as $h_n$, $g_F$, $h_F$, respectively. If it is hard to obtain the exact values for those parameters, their statistics (mean $\bar{h}_n$, $\bar{g}_F$, $\bar{h}_F$ and the distribution) can be known through monitoring reference signals as an alternative.

Before constructing the optimization problem for the system, it may be known the division of CQI domain at the MeNB, i.e., Carrier to Interference plus Noise Ration (CINR) quantization regions, $[T_0, T_1), [T_1, T_2), \ldots, [T_{L-1}, T_L])$ (wherein $T_0=0$, $T_L=+\infty$). Values $T_0$ to $T_L$ can be called as quantization thresholds and each quantization region is designated by CQI feedback index l with a range from 0 (which means out of range, referred to as OOR hereinafter) to L−1. To obtain maximum spectrum efficiency, the throughput for macrocell can also be maximized and the division of the CINR domain can be determined by a maximization problem which maximize the throughput for macrocell.

Firstly, define $\tilde{m} = \text{argmax}_m\{g_1, g_2, \ldots, g_M\}$, then the CQI quantization thresholds are derived from the distribution of $g_{\tilde{m}}$ instead of individual $g_m$. The cdf. function of the CNR at MUE $\tilde{m}$ (i.e., SINR at MUE $$\tilde{m} : \gamma_{\tilde{m}} \triangleq \frac{g_{\tilde{m}}}{N_0}$$

where $N_0$ is the background Gaussian noise with mean $\sigma^2$) to be $F_{\Gamma_{\tilde{m}}}(\gamma)$. Additionally, as stated hereinbefore, the transmission power is constant and thus the transmission power in each of quantization regions 1 to L−1 is equal to $P_M$; however, if the OOR is sent back from MUE $\tilde{m}$ then the MeNB will stop transmitting by setting the downlink transmission power to be zero. Based on the above information, the maximization problem can be construct as follows:

$$\max_T \bar{R}_M = \sum_{l=1}^{L-1} \log(1 + T_l P_M) F_{\Gamma_{\tilde{m}}}(T_l, T_{l+1}) \quad (1)$$

$$s.t. \quad 0 = T_0 \leq \ldots \leq T_l \leq T_{l+1} \ldots \leq T_L = +\infty$$

wherein $\bar{R}_M$ denotes the expected average throughput for the macrocell, and $$F_{\Gamma_{\tilde{m}}}(a,b) \triangleq F_{\Gamma_{\tilde{m}}}(b) - F_{\Gamma_{\tilde{m}}}(a).$$

It is noted that the summation is from quantize region 1 instead of region 0 since MeNB does not contribute to the total throughput in region 0 (OOR). By solving the problem, it will obtain the optimal division of CINR domain [$T_1$, $T_2$), ..., [$T_{L-1}$, $T_L$] and accordingly the codebook for the MeNB is also determined.

In the following, we will describe the construction of the optimization problem for the femtocell. But before that, the opportunities for the secondary user to transmit its own packets will be discussed firstly. It is apparent that the most obvious opportunity comes when all the receivable CQIs are 0, i.e. OOR, which means that no MUE within FTR is scheduled as the active user, and thus femto downlink transmission will not interfere with any MUE at all. Besides, another transmission opportunity for femtocell exists when CQI>0 only if the interference from the FAP could be tolerable for the MUE, i.e., the received CINR of the MUE is still greater than lower quantization threshold Tl (it is assumed that l(>0) is sent from the MUE side). As has been described in the foregoing, the optimization problem can be formulated for two types of transmission opportunities which can be further divided three cases. In the following, the optimization problem for each of the cases will be described in details.

Case 1: Scheduling Information being Available at FAP

In this case, FAP will know whether this MUE within the FTR is active or not and thus the MUE with in the FTR can be protected when it is active (i.e., scheduled). However, due to the long delay in the backhaul connection, it is not practical for FAP to have this knowledge accurately, but the result can serve as a benchmark for comparison.

In order to quantify the rate loss to the macrocell, it can initially calculate the probability of $\tilde{n}=\hat{m}$, i.e. the MUE who has the highest CINR is situated in the FTR. By assuming i.i.d. Rayleigh fading on each macrocell downlink channel ($\bar{g}_M$ indicates the average power gain), the probability that the MUE with highest CINR is within the FTR is simply given by N/M through symmetry assumption. Therefore, the probability that the transmission of FAP will have no interference to MUEs since the active MUE is out of the FTR is 1−N/M. On the other hand, when $\tilde{n}=\hat{m}$, the FAP should be careful on choosing proper transmission power such that the rate loss to the macrocell user is under the predefined threshold $R_{lo}$, that is to say it should meet the following equation:

$$\frac{N}{M}\left(\sum_{l=1}^{L-1}\log(1+T_l P_M)\left(F_{\Gamma_{\tilde{n}},l}-F_{\tilde{\Gamma}_{\tilde{n}},l}\right)\right) \leq R_{lo} \quad (2)$$

wherein $F_{\Gamma_{\tilde{n}},l}=F_{\Gamma_{\tilde{n}}}(T_l, T_{l+1})$, $F_{\tilde{\Gamma}_{\tilde{n}},l}=F_{\tilde{\Gamma}_{\tilde{n}}}(T_l, T_{l+1})$, the new random variable $\tilde{\Gamma}_{\tilde{n}}$ represents the CINR at MUE $\tilde{n}$ when the interference from FAP is included. The difference between $F_{\Gamma_{\tilde{n}},l}$ and $F_{\tilde{\Gamma}_{\tilde{n}},l}$ indicates the outage probability of MUE $\tilde{n}$ under the interference, i.e., $\tilde{\gamma}_{\tilde{n}}<T_l$. The SINR $\tilde{\gamma}_{\tilde{n},l}$ can be represented by the following equation:

$$\tilde{\gamma}_{\tilde{n},l} = \frac{g_{\tilde{n}}}{N_0 + h_{\tilde{n}}P_{F,l}} = \frac{\gamma_{\tilde{n}}}{1+\frac{h_{\tilde{n}}P_{F,l}}{N_0}}. \quad (3)$$

Therefore, the corresponding long-term power limitation constraint for the FAP can be represented by the following:

$$\left(1-\frac{N}{M}\right)P_{F,0} + \frac{N}{M}\sum_{l=0}^{L-1}F_{\Gamma_{\tilde{n}},l}P_{F,l} \leq P_{F,th} \quad (4)$$

wherein the first item denotes the case when no active MUE is located within the FTR.

Case 2: Scheduling Information being Unavailable at FAP and MUEs being Protected Based on Probability to be Scheduled In this case, it is not easy for the FAP to know whether a MUE within the FTR is active or not due to lack of the reliable interface between MeNB and FAP. However, the i.i.d. distribution of the macro downlink channels causes the max-C/I scheduler fairly choosing the MUEs inside and outside the FTR. Therefore, the average rate loss to the MUE $\tilde{n}$ in each fading timeslot can be estimated by assuming that it has probability N/M to be selected as the active user. In such a way, the corresponding rate loss and power limitation constraints in this case can be given by the following equations (5) and (6), respectively;

$$\frac{N}{M}\left(\sum_{l=1}^{L-1}\log(1+T_l P_M)\left(F_{\Gamma_{\tilde{n}},l}-F_{\tilde{\Gamma}_{\tilde{n}},l}\right)\right) \leq R_{lo} \quad (5)$$

$$\sum_{l=0}^{L-1}F_{\Gamma_{\tilde{n}},l}P_{F,l} \leq P_{F,th} \quad (6)$$

wherein the rate loss constraint is similar to that as shown in equation (2) but the power limitation constraint on the average power limitation is different from equation (4) since in this case the FAP does not know whether the active MUE is inside or outside the FTR. In the other words, the first item in (4) and the corresponding probability of N/M is removed out when no scheduling information is available. The FAP can only protect the MUE within FTR a certain probability such that the long term rate loss is still under control.

Case 3: Scheduling Information being Unavailable at FAP and MUEs being Protected at all Time In order to protect the active MUE even more, we can hypothetically identify that the active MUE is within the FTR at all time, which leads to the conservative usage of the subband. In such a case, the corresponding rate loss and power limitation constraint can be given by the following equations (7) and (8);

$$\left(\sum_{l=1}^{L-1}\log(1+T_l P_M)\left(F_{\Gamma_{\tilde{n}},l}-F_{\tilde{\Gamma}_{\tilde{n}},l}\right)\right) \leq R_{lo} \quad (7)$$

$$\sum_{l=0}^{L-1}F_{\Gamma_{\tilde{n}},l}P_{F,l} \leq P_{F,th}. \quad (8)$$

So far, the rate loss constraints and the power limitation constraints for different cases have been established and next the objective function will be described. As mentioned before, the objective of this optimization problem is to maximize the femtocell throughput by judicious power selection. In the slow block fading channel, it is better to apply outage rather than ergodic capacity and therefore, when perfect channel state information (CSI) is unavailable at the FAP, a small outage probability threshold $\epsilon$ can be introduced such that the transmission rate can be derived to meet the outage threshold. In this manner, the average effective throughput $\bar{R}_F$ in the case that the scheduling information is available at the FAP can be given as bellows:

$$\bar{R}_F = \left(1-\frac{N}{M}\right)(1-\epsilon)\log(1+\gamma_{F,0}) + \frac{N}{M}\sum_{l=0}^{L-1}(1-\epsilon)\log(1+\gamma_{F,l})F_{\Gamma_{\tilde{n}},l}. \quad (9)$$

Similarly, the average effective throughput $\bar{R}_F$ in the cases that the scheduling information is unavailable at the FAP can be given by equation (10):

$$\bar{R}_F = \sum_{l=0}^{L-1} (1-\epsilon)\log(1+\gamma_{F,l}) F_{\Gamma_{\bar{h},l}} \tag{10}$$

Additionally, the pre-designed SINR $\gamma_{F,l}$ should satisfy with the following equation (11):

$$Pr\left\{\frac{g_F P_{F,l}}{h_F P_M + N_0} < \gamma_{F,l}\right\} \leq \epsilon. \tag{11}$$

Therefore, if we allow the transmission rate to be $\log(1+\gamma_{F,l})$, the corresponding outage probability should be less than or equal to the threshold $\epsilon$. Furthermore, equations (9) and (10) can be further reduced based on the following derivation from equation (11).

Firstly, it is assumed that the wireless channels will undergo Rayleigh fading with mean $\bar{g}_F$ and $\bar{h}_F$. Then, equation (11) can be further derived as $$Pr\left\{\frac{g_F P_{F,l}}{h_F P_M + N_0} < \gamma_{F,l}\right\} = Pr\{g_F P_{F,l} < \gamma_{F,l}(h_F P_M + N_0)\} = \tag{12}$$

$$1 - e^{-\frac{\gamma_{F,l}\sigma^2}{\bar{g}_F P_{F,l}}} \Big/ \left(1 + \frac{\gamma_{F,l}\bar{h}_F P_{M,l}}{\bar{g}_F P_{F,l}}\right) = \epsilon$$

i.e., it can choose a proper SINR threshold $\gamma_{F,l}$ such that the same outage probability constraint is met for any $l=0, 1, \ldots, L-1$. The proper SINR threshold $\gamma_{F,l}$ can be derived by solving the following equation which is derived form equation (12):

$$1 - e^{-\frac{\gamma_{F,l}\sigma^2}{\bar{g}_F P_{F,l}}} = (1-\epsilon)\left(1 + \frac{\gamma_{F,l}\bar{h}_F P_{M,l}}{\bar{g}_F P_{F,l}}\right) \tag{13}$$

wherein at the left hand side is a monotonically decreasing function and at the right one is increasing in terms of $\gamma_{F,l}$, which means that there is only one solution for this SINR threshold $\gamma_{F,l}$ and the solution can be numerically derived.

Additionally, the searching procedure can be further simplified by approximating the exponential function with a straight line between $(0,1)$ and $(-\log(1-\epsilon)\bar{g}_F P_F/\sigma^2, 1-\epsilon)$, then the intersection of these two straight lines on the left and right hand sides of the equation is the solution for $\gamma_{F,l}$. Therefore, after simple algebra, it will have $$\gamma_{F,l} = \frac{\epsilon \bar{g}_F P_{F,l}}{(1-\epsilon)\bar{h}_F P_M - \epsilon\sigma^2/\log(1-\epsilon)} = \kappa P_{F,l}. \tag{14}$$

Therefore, the corresponding transmission rate threshold is given by $\log(1+\gamma_{F,l})$ wherein parameter $$\kappa = \frac{\epsilon \bar{g}_F}{(1-\epsilon)P_M \bar{h}_F - \epsilon\sigma^2/\log(1-\epsilon)}$$

and denotes the tuning factor when the macrocell interference is included in the received signal at the FUE. In such a way, after the transmission power is determined, the corresponding transmission rate can be determined also.

Further, based on equation (14), equations (9) and (10) can be simplified and substituted by the following approximation:

$$\bar{R}_F \approx \left(1 - \frac{N}{M}\right)(1-\epsilon)\log(1+\kappa P_{F,0}) + \frac{N}{M}\sum_{l=0}^{L-1}(1-\epsilon)\log(1+\kappa P_{F,l}) F_{\Gamma_{\bar{h},l}} \tag{15}$$

$$R_F \approx \sum_{l=0}^{L-1}(1-\epsilon)\log(1+\kappa P_{F,l}) F_{\Gamma_{\bar{h},l}} \tag{16}$$

It has been proved through a simulation that this approximation is suitable especially when the outage probability is less than 20%.

Based on the above rate loss constrains and power limitation constraints and the average effective throughput $\bar{R}_F$, the optimization problem can be constructed as below:

$$\max_{P_F} \bar{R}_F \tag{17}$$

s.t. (2)(4), (5)(6), or (7)(8)

$P_{F,l} \geq 0 \ l = 0, 1, \ldots, L-1.$

The objective function follows equation (15) when scheduling information is available at the FAP, and equation (16) when the information is unavailable. The problem is aiming to maximize the effective average throughput of the femtocell subject to one of the three sets of the rate loss and power limitation constraints as discussed early and the positivity of the transmission power.

The equation (17) is a non-linear and non-convex optimization problem, which is normally hard to solve in polynomial time. However, after simple variable substitution $$Q_{F,l} \triangleq 1/P_{F,l},$$

both the rate loss and the power limitation constraint appear to be convex constraints, and the objective is a convex function in terms of the new variables since the parameter k is constant. Therefore, the above rate maximization is a typical differential convex problem. By applying the sequential convex programming (SCP) which is described in "Sequential convex programming" by S. P. Boyd, and can be found for example at the following website: http://www.stanford.edu/class/ee364b/lectures/seq_slides.pdf, the objective function will be linearized whenever a new set of $Q_{F,l}$ is available. The algorithm will stop until the convergence is achieved.

In such a way, the optimization problem can be solved and $P_{F,l}$ will be determined finally, wherein $l=0, 1, \ldots, L-1$. In such a way, the codebook for the FAP can determined based on $P_{F,l}$.

Therefore, the FAP can listen to the PUCCH to obtain the CQI index from MUEs located in the FTR and according to the adopted scheme (case 1, case 2, case 3), select a suitable CQI index as the basic reference CQI index for determining the transmission power. As stated hereinabove, for the scenario that the scheduling information is available at the FAP, the CQI index of a scheduled primary receiver located in the transmission range of the secondary transmitter can be taken as the basic reference channel quality; or otherwise CQI index can be considered as 0 (OOR). Additionally, for the scenario the scheduling information is unavailable, the highest one of received CQI indices can be considered as the basic reference channel quality. After that, it can select a transmission power corresponding to the selected basic reference CQI index from the corresponding codebook.

Additionally, the present inventors have carried out some simulations on the specific application according to the present invention. In the simulations, it is assumed that all the channel links follow exponential distribution (Rayleigh fading) with mean values $\bar{g}_n = \bar{h}_F = 1$ (n=1, ..., M), $\bar{g}_F = 4$. There are totally 10 MUEs (i.e., M=10) within the whole macrocell, and 4 MUEs (i.e. N=4) are in the FTR. Besides, 4-bit CQI feedback from each MUE within the FTR is used, which means the domain of CINR is divided into 16 quantize regions, which are indicated by index 1=0 to 15. In addition, the transmission power and the Gaussian noise at the receiver side are equal to 1. The rate loss tolerance at the macrocell ($R_{lo}/R_M$) is assumed to be 10%, which is same as the outage threshold for the femto link $\epsilon = 10\%$ unless notified otherwise.

Figure 6A:
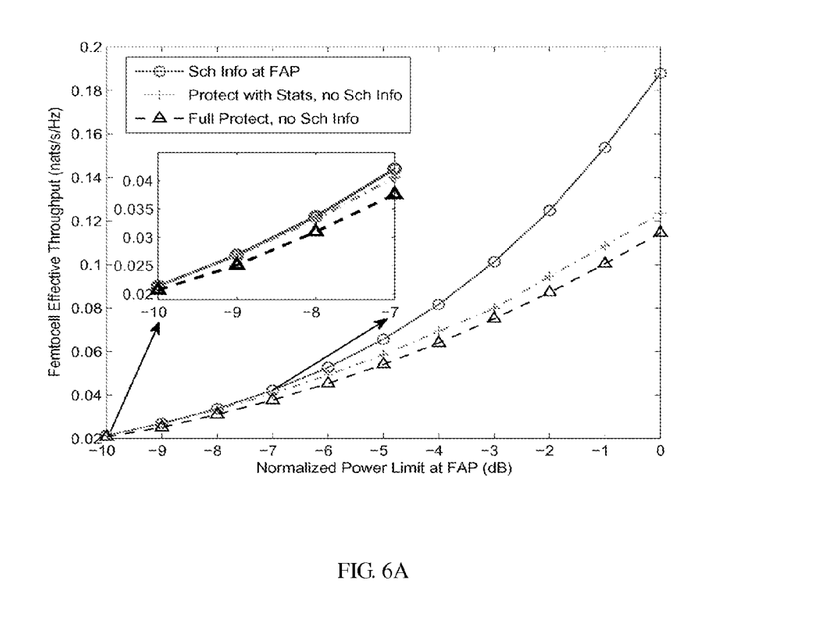
FIGS. 6A and 6B illustrate graphs showing results of simulations on three different cases according to the present application.

FIG. 6A illustrates a diagram of the throughput with increased power limitation at FAP in a simulation, wherein it is assumed that the interfering channel from FAP to the MUE within FTR is relatively weak, i.e., $\bar{h}_n = 0.4$ (n=1, ..., N). In FIG. 6A, the simulation results for the three cases mentioned above (i.e., case 1, case 2 and case 3) are indicated by circles and a solid line, crosses and dot and a dash line, and triangles and a dash line respectively. From FIG. 6A, it can be seen that case 1 achieves a best throughput, and case 2 achieves a higher throughput than case 3 always but their difference is small. Additionally, as compared to case 2, case 3 is more competent on mitigation the interference but achieves a substantially comparable throughput for femtocell.

Figure 6B:
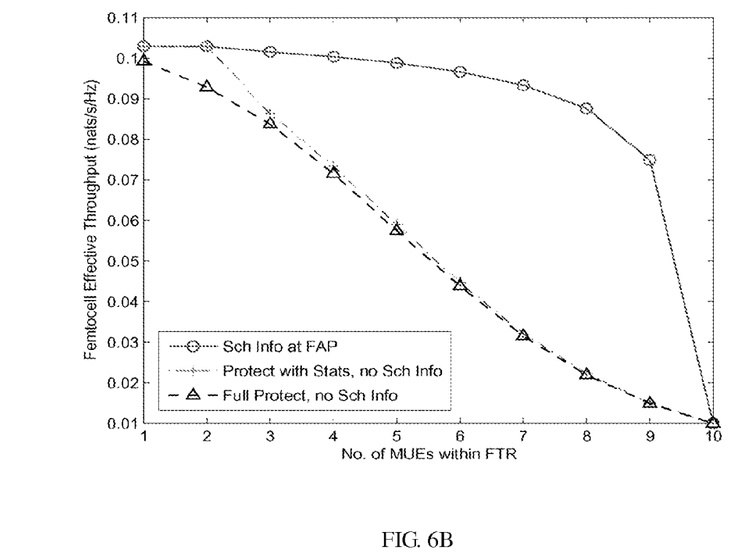

FIG. 6B illustrates a diagram of the femtocell throughout versus total number of MUE within FTR in a simulation, wherein it is assumed the interfering links from FAP to MUEs is strong, i.e., $\bar{h}_n = 2$. From FIG. 6B, it is observed that as the increase of the total number of MUEs, the femtocell throughput decreases since the femtocell will sacrifice more to keep interference with MUEs within the FTR under a tolerable level. In addition, similarly to FIG. 6A, case 1 achieves the best result; case 3 achieves substantially comparable results with case 2 except when only one or two MUEs are within FTR; and all of the three cases obtain the same result when all MUEs are located within the FTR.

Hereinbefore, the present invention has been detailed in conjunction with the downlink transmission of an exemplary system. The skilled person in the art should appreciate that the present invention can also be applied to the uplink transmission. Regarding to the uplink transmission, the channel quality information on the primary uplink can be obtained by the FAP (which is the secondary receiver in the case) through requiring the information from MeNB (which is the primary receiver in this case) located in the transmission range of a FUE (which is a secondary transmitter in such a case); and the FAP can determine the transmission power and optional transmission rate for the FUE and then transmit the determined transmission power and transmission rate to FUE so that the FUE can transmit with the determined transmission power at the determined rate.

Besides, for a purpose of illustration, reference is made to the macro/femto heterogeneous system to describe the present invention. However, it should be noted that the present invention is not limited thereto and can be applied in various hierarchical spectrum sharing systems, such as macro/femto network, a macro/pico network, a macro/micro network, cognitive radio and so on. By modifying the specific detailed operations slightly according to the characteristics of various system, the present invention can be applied to the other system than the macro/femto heterogeneous system, which will be implemented easily by the skilled person in the art from the teaching herein and based on the knowledge he have had, and thus the description of the other system is omitted herein for simplification.

Next, an apparatus for determining a transmission power of a secondary transmitter in a hierarchical spectrum sharing system as provided by the present invention will be described with reference to FIG. 7, which illustrates a block diagram of an apparatus 700 for determining a transmission power according to an embodiment of the present invention.

Figure 7:
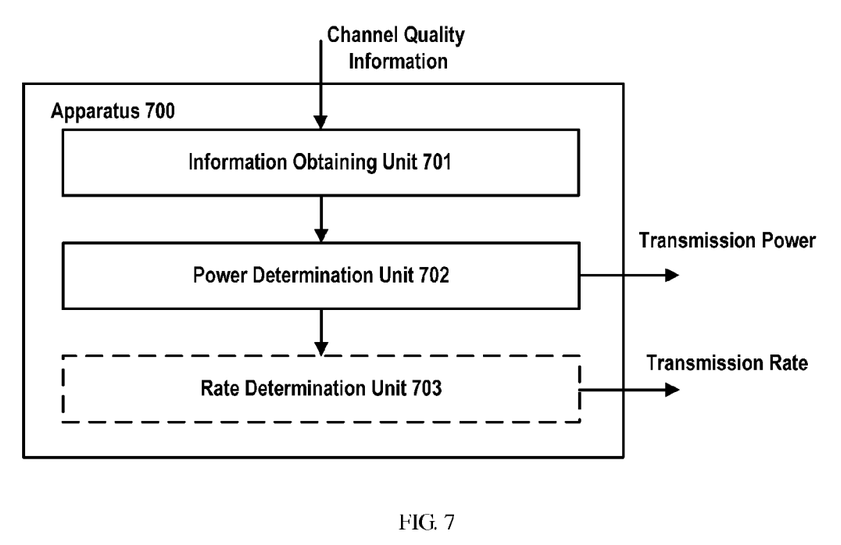
FIG. 7 illustrates a block diagram of an apparatus for determining a transmission power of a secondary transmitter in a hierarchal spectrum sharing system according to an embodiment of the present invention.

As illustrated in FIG. 7, the apparatus 700 can comprise information obtaining unit 701 and power determination unit 702, wherein the information obtaining unit 701 is configured for obtaining channel quality information on a primary link from at least one primary receiver within a transmission range of the secondary transmitter; and the power determination unit 702 is configured for determining the transmission power for the secondary transmitter based on the channel quality information, wherein the transmission power is matched with the channel quality indicated by the channel quality information.

In an embodiment of the present invention, the power determination unit 702 can be further configured for determining the transmission power based on the channel quality information so that the secondary transmitter's throughput is optimized with a tolerable rate loss to the primary receiver. In another embodiment of the present invention, the power determination unit 702 can be further configured for selecting the transmission power corresponding to a channel quality indicator index indicated by the channel quality information from a predetermined power control codebook in which each transmission power corresponding to each channel quality indicator index could ensure that the secondary transmitter's throughput is maximized with a tolerable rate loss to the primary receiver.

In a further embodiment of the present invention, the predetermined power control codebook can be determined for any one of: scheduling information on primary users being available at the secondary transmitter and the primary receiver being protected only when the primary receiver is scheduled; scheduling information on primary users being unavailable at the secondary transmitter and the primary receiver being protected based on a probability of the primary receiver to be scheduled; and scheduling information on primary users being unavailable at the secondary transmitter and the primary receiver being protected at all times.

In a still further embodiment of the present invention, the highest one of channel qualities as indicated by the channel quality information can be considered as a basic reference channel quality for determining the transmission power for the secondary transmitter. In a still yet further embodiment of the present invention, the channel quality of a scheduled primary receiver located in the transmission range of the secondary transmitter or the possible lowest channel quality can be considered as a basic reference channel quality for determining the transmission power for the secondary transmitter.

In another embodiment of the present invention, apparatus 700 can further comprise rate determination unit 703 for determining transmission rate for the secondary from the determined transmission power.

In a further embodiment of the present invention, the information obtaining unit 701 is further configured for listening to a Control/Feedback Channel for the primary link.

In a still further embodiment of the present invention, the hierarchical spectrum sharing system can comprise a macro/femto heterogeneous network, and wherein the primary receiver can be a macrocell user equipment and the secondary transmitter can be a femtocell access point.

In another embodiment of the present invention, the predetermined power control codebook is determined by an offline unit which will be described with reference to FIG. 8.

Figure 8:
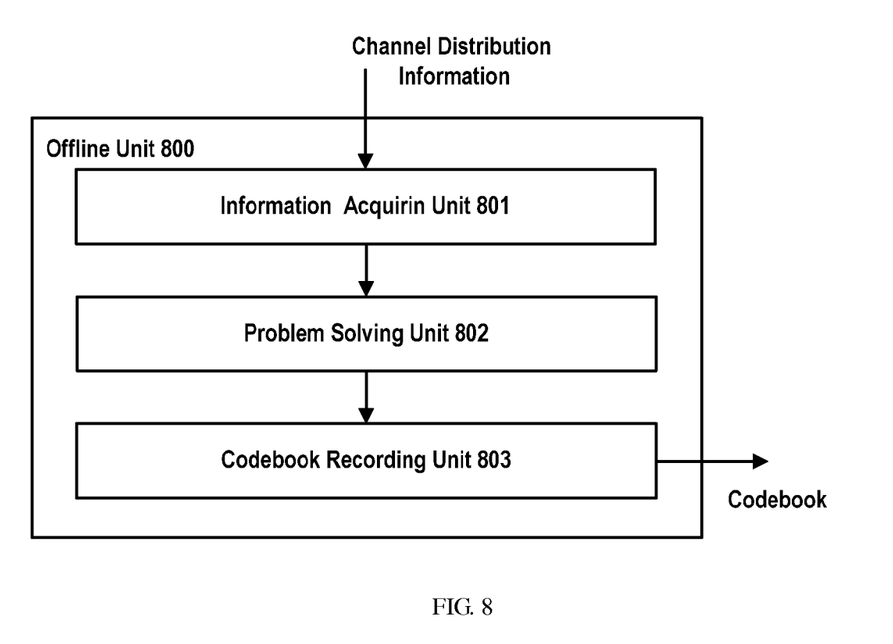
FIG. 8 illustrates a block diagram of an offline unit for a predetermined power control codebook according to an embodiment of the present invention.

As shown in FIG. 8, which illustrates a block diagram of an offline unit according to an embodiment of the present invention, the offline unit 800 can comprise information acquiring unit 801 for acquiring channel distribution information for the primary link and cross-tier links; problem solving unit 803 for solving an optimization problem which maximizes the secondary transmitter's throughput under the tolerable rate loss to the primary receiver and power constraint at the secondary transmitter based on the channel distribution information, so as to obtain each transmission power corresponding to each channel quality indicator index; and codebook recording unit 803 for recording a codebook indicating the correspondence between each transmission power and each channel quality indicator index as the predetermined power control codebook.

The skilled in the art can appreciate that the offline unit 800 can be an integral part of apparatus 700, and it can also be a separate component which can provide the codebook for using by apparatus.

Besides, it should be noted that operations of respective units as comprised in the apparatus 700 and unit 800 substantially correspond to respective method steps as previously described. Therefore, for detailed operations of respective units in the apparatuses 700 and 800, please refer to the previous descriptions of the methods of the present invention with reference to FIGS. 3 to 6B.

By far, the present invention has been described with reference to the accompanying drawings through particular preferred embodiments. However, it should be noted that the present invention is not limited to the illustrated and provided particular embodiments, but various modification may be made within the scope of the present invention.

Further, the embodiments of the present invention can be implemented in software, hardware or the combination thereof. The hardware part can be implemented by a special logic; the software part can be stored in a memory and executed by a proper instruction execution system such as a microprocessor or a dedicated designed hardware. Those normally skilled in the art may appreciate that the above method and system can be implemented with a computer-executable instructions and/or control codes contained in the processor, for example, such codes provided on a bearer medium such as a magnetic disk, CD, or DVD-ROM, or a programmable memory such as a read-only memory (firmware) or a data bearer such as an optical or electronic signal bearer. The apparatus and its components in the present embodiments may be implemented by hardware circuitry, for example a very large scale integrated circuit or gate array, a semiconductor such as logical chip or transistor, or a programmable hardware device such as a field-programmable gate array, or a programmable logical device, or implemented by software executed by various kinds of processors, or implemented by combination of the above hardware circuitry and software, for example by firmware.

Though the present invention has been described with reference to the currently considered embodiments, it should be appreciated that the present invention is not limited the disclosed embodiments. On the contrary, the present invention is intended to cover various modifications and equivalent arrangements falling within in the spirit and scope of the appended claims. The scope of the appended claims is accorded with broadest explanations and covers all such modifications and equivalent structures and functions.

What is claimed is:

1. A method for determining a transmission power of a secondary device in a hierarchical spectrum sharing system, comprising:
    obtaining Channel Quality Indicator (CQI) by the secondary device, on a primary link from a primary device within a transmission range of the secondary device; and
    determining the transmission power for the secondary device based on the CQI, wherein the transmission power is matched with the channel quality indicated by the CQI,
    wherein determining the transmission power for the secondary device based on the CQI comprising:
        determining the transmission power based on the CQI so that the secondary device's throughput is optimized with a tolerable rate loss to the primary device, and
        selecting the transmission power corresponding to a channel quality indicator index indicated by the CQI from a predetermined power control codebook in which each transmission power corresponding to each channel quality indicator index could ensure that the secondary device's throughput is maximized with the tolerable rate loss to the primary device.

2. The method of claim 1, wherein the predetermined power control codebook is determined offline by
    acquiring channel distribution information for the primary link and cross-tier links;
    solving an optimization problem which maximizes the secondary device's throughput under the tolerable rate loss to the primary device and power constraint at the secondary device based on the channel distribution information, so as to obtain each transmission power corresponding to each channel quality indicator index; and
    recording a codebook indicating the correspondence between each transmission power and each channel quality indicator index as the predetermined power control codebook.

3. The method of claim 1, wherein the predetermined power control codebook is determined for any one of:
    scheduling information on primary users being available at the secondary device and the primary device being protected only when the primary device is scheduled;
    scheduling information on primary users being unavailable at the secondary device and the primary device being protected based on a probability of the primary device to be scheduled; and
    scheduling information on primary users being unavailable at the secondary device and the primary device being protected at all times.

4. The method of claim 1, wherein the highest one of channel qualities as indicated by the CQI is considered as a basic reference channel quality for determining the transmission power for the secondary device.

5. The method of claim 1, wherein the channel quality of a scheduled primary device located in the transmission range of the secondary device or the possible lowest channel quality is considered as a basic reference channel quality for determining the transmission power for the secondary device.

6. The method of claim 1, further comprising:
determining transmission rate for the secondary transmitter from the determined transmission power.

7. The method of claim 1, wherein obtaining the CQI on the primary link from the at least one primary device comprising:
listening to a Control/Feedback Channel for the primary link.

8. The method of claim 1, wherein the hierarchical spectrum sharing system comprises a macro/femto heterogeneous network, and wherein the primary device is a macrocell user equipment and the secondary device is a femtocell access point.

9. An apparatus for determining a transmission power of a secondary device in a hierarchical spectrum sharing system, comprising:
information obtaining unit for obtaining Channel Quality Indicator (CQI) on a primary link from a primary device within a transmission range of the secondary device; and
power determination unit for determining the transmission power for the secondary transmitter based on the CQI, wherein the transmission power is matched with the channel quality indicated by the CQI,
wherein the power determination unit further:
determines the transmission power based on the CQI so that the secondary device's throughput is optimized with a tolerable rate loss to the primary receiver; and
selects the transmission power corresponding to a channel quality indicator index indicated by the CQI from a predetermined power control codebook in which each transmission power corresponding to each channel quality indicator index could ensure that the secondary device's throughput is maximized with the tolerable rate loss to the primary receiver.

10. The apparatus of claim 9, wherein the predetermined power control codebook is determined by an offline unit comprising
information acquiring unit for acquiring channel distribution information for the primary link and cross-tier links;
problem solving unit for solving an optimization problem which maximizes the secondary device's throughput under the tolerable rate loss to the primary device and power constraint at the secondary device based on the channel distribution information, so as to obtain each transmission power corresponding to each channel quality indicator index; and
codebook recording unit for recording a codebook indicating the correspondence between each transmission power and each channel quality indicator index as the predetermined power control codebook.

11. The apparatus of claim 9, wherein the predetermined power control codebook is determined for any one of:
scheduling information on primary users being available at the secondary device and the primary device being protected only when the primary device is scheduled;
scheduling information on primary users being unavailable at the secondary device and the primary device being protected based on a probability of the primary device to be scheduled; and
scheduling information on primary users being unavailable at the secondary device and the primary device being protected at all times.

12. The apparatus of claim 9, wherein the highest one of channel qualities as indicated by the CQI is considered as a basic reference channel quality for determining the transmission power for the secondary device.

13. The apparatus of claim 9, wherein the channel quality of a scheduled primary device located in the transmission range of the secondary device or the possible lowest channel quality is considered as a basic reference channel quality for determining the transmission power for the secondary device.

14. The apparatus of claim 9, further comprising:
rate determination unit for determining transmission rate for the secondary device from the determined transmission power.

15. The apparatus of claim 9, wherein the information obtaining unit is further for:
listening to a Control/Feedback Channel for the primary link.

16. The apparatus of claim 9, wherein the hierarchical spectrum sharing system comprises a macro/femto heterogeneous network, and wherein the primary device is a macrocell user equipment and the secondary device is a femtocell access point.

* * * * *